United States Patent [19]
Fassler et al.

[11] Patent Number: 5,910,813
[45] Date of Patent: Jun. 8, 1999

[54] ACCURATELY LOCATING COLOR DONOR ELEMENT IN MAKING COLOR FILTER ARRAYS

[75] Inventors: Werner Fassler, Rochester; Charles D. DeBoer, Palmyra; James E. Pickering, Holcomb, all of N.Y.

[73] Assignee: Eastman Kodak Company, Rochester, N.Y.

[21] Appl. No.: 08/846,692

[22] Filed: Apr. 30, 1997

[51] Int. Cl.[6] ................................................. B41J 25/308
[52] U.S. Cl. .............................................. 347/215; 400/56
[58] Field of Search .................................. 347/171, 224, 347/215; 400/55, 56, 57, 59

[56] References Cited

U.S. PATENT DOCUMENTS

| | | | |
|---|---|---|---|
| 5,170,178 | 12/1992 | Yokoyama | 347/224 |
| 5,399,031 | 3/1995 | Whritenor | 400/120.04 |
| 5,468,076 | 11/1995 | Hirano et al. | 400/55 |
| 5,599,766 | 2/1997 | Boroson et al. | 503/227 |
| 5,714,301 | 2/1998 | Boroson et al. | |

Primary Examiner—N. Le
Assistant Examiner—Anh T. N. Vo
Attorney, Agent, or Firm—Raymond L. Owens

[57] ABSTRACT

Apparatus having an array of print heads for transmitting energy to a colorant donor element to cause colorant to transfer to produce color filter array patterns in an image-receiving layer of a color filter array includes a structure for locating the colorant donor element and the image-receiving layer a precise sublimation gap G from the image-receiving layer surface; and for maintaining this sublimation gap G to compensate for dimensional variations in the image-receiving layer.

4 Claims, 4 Drawing Sheets

ACCURATELY LOCATING COLOR DONOR ELEMENT IN MAKING COLOR FILTER ARRAYS

FIELD OF THE INVENTION

This invention relates to apparatus for making color filter array (CFA) elements by thermal dye transfer on a donor element.

BACKGROUND OF THE INVENTION

Liquid crystal display devices are known for digital display in electronic calculators, clocks, household appliances, audio equipment, etc. Liquid crystal displays are being developed to replace cathode ray tube technology for display terminals. Liquid crystal displays occupy a smaller volume than cathode ray tube devices with the same screen area. Also, they are lighter than cathode ray tubes, and are therefore useful in portable device displays such as lap-top computers. In addition, liquid crystal display devices usually have lower power and lower voltage requirements than corresponding cathode ray tube devices.

One commercially available type of color filter array element that has been used in liquid crystal display devices for color display capability is a transparent support having a gelatin layer thereon which contains dyes having the additive primary colors red, green and blue in a mosaic pattern obtained by a photolithographic technique. To prepare such a color filter array element a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. Misalignment or improper deposition of color materials may occur during any of these operations. Further details of this process are disclosed in U.S. Pat. No. 4,081,277.

Color liquid crystal display devices generally include two spaced glass panels which define a sealed cavity that is filled with a liquid crystal material. For actively-driven devices, a transparent electrode is formed on one of the glass panels, which electrode may be patterned or not, while individually addressable electrodes are formed on the other of the glass panels. Each of the individual electrodes has a surface area corresponding to the area of one picture element, or pixel. If the device is to have color capability, each pixel must be aligned with a color area, e.g. red, green, or blue, of a color filter array. Depending on the image to be displayed, one or more of the pixel electrodes is energized during display operation to permit full light, no light, or partial light to be transmitted through the color filter area associated with that pixel. The image perceived by a user is a blending of colors formed by the transmission of light through adjacent color filter areas.

In the display of high quality images, the quality of the color filter array is quite important. Unfortunately, the cost of such color filter arrays is quite high and is one of the most costly components of the liquid crystal display. One promising method to reduce the cost of color filter array manufacture while still maintaining the required quality is by use of thermal dye transfer method as discussed in U.S. Pat. Nos. 4,923,860 and 5,229,232.

A difficulty with prior art apparatus is that they require the use of masks and also use contact printing. Masks are, of course, expensive and need to be moved in and out of position and contact printing has problems associated with wear and the difficulty to maintain in clean condition because contact printing necessarily produce particles through micro motion.

SUMMARY OF THE INVENTION

The object of this invention is to provide a print head for producing color filter array lines and pixel elements in an effective manner.

The object is achieved by apparatus having an array of print heads for transmitting energy to a colorant donor element to cause colorant to transfer to produce color filter array patterns in an image-receiving layer of a color filter array comprising:

a) means for locating the colorant donor element and the image-receiving layer a precise sublimation gap G from the image-receiving layer surface; and b) means for maintaining this sublimation gap G to compensate for dimensional variations in the image receiving layer.

It is an advantage of the present invention to provide a colorant donor element positioning arrangement for making color filter arrays where the energy front control can be relaxed. The print head is positioned in accordance with variations in the polymer image-receiving layer to maintain a desired sublimation gap to achieve uniform color control. By continuous monitoring and adjusting of print head position, a closely controlled sublimation gap distance can be maintained to yield better quality.

Another advantage of the present invention is that it is particularly suitable for forming large color filter arrays which can be used in liquid crystal display devices.

The print head permits CFA manufacturing with substantially less complications than present in the prior art. This is possible because the print head controls the sublimation gap with static or dynamic positioning techniques and also through masking generates the pixel geometrics.

DETAILED DESCRIPTION OF THE PREFERRED EMBODIMENTS

Figure 1:
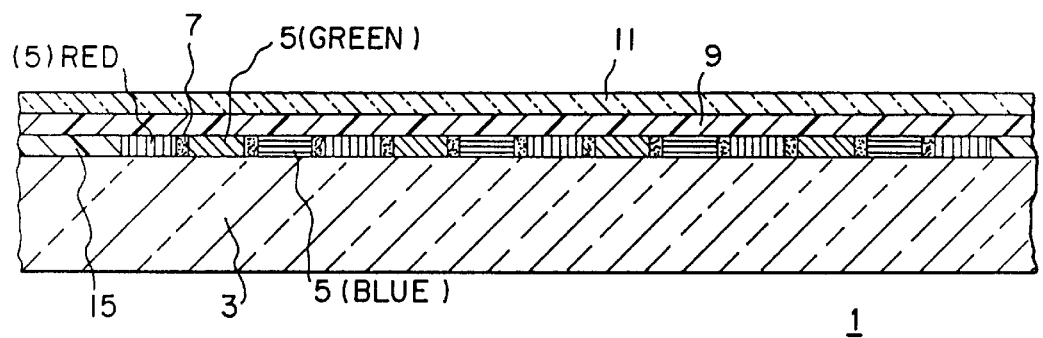
FIG. 1 is a cross sectional view of a typical color filter made in accordance with the present invention.

A useful color filter array should have good thermal resistance, so that subsequent high temperature processing steps such as vacuum sputtering of conductive layers will not degrade the color quality of the pixel elements of the array. The colorant of the pixel elements of the pixel array should also be chosen to have good fade resistance to the viewing to the viewing light that illuminates them. The colorants must have good color purity, and the overall transitivity of the color filter array should be as high as possible, consistent with good color purity and saturation, so that the power of the illuminating lamp need not to be excessively high. Additional requirements on the color filter array are that the resolution of the pixels be high, the spacing be uniform, so that the images appear sharp, detailed, and uniform to the eye. In addition point defects such as missing pixels (pixel drop outs) must not occur in an array image.

As noted above, the image-receiving layer contains a repeating pattern of colorants, and in a preferred embodiment of the invention, the mosaic pattern consists of a set of red, green, and blue additive primaries.

In a preferred embodiment of the invention, each area of primary color and each set of primary colors are separated from each other by an opaque area e.g., black grid lines. This has been found to give improved color reproduction and reduce flare in the displayed image, and protect photosensitive electronics from light.

The size and shape of color pattern set is a function of viewing distance and preference. In general, the individual pixels of the set are from about 50 to 600 microns and do not have to be of the same size.

In a preferred embodiment of the invention, the repeated mosaic pattern of colorant to form the color filter array element consists of uniform, square or rectangular or hexagonal repeating areas as follows B R G B R G B R G
B R G B R G B R G
B R G B R G B R G
or;

B R G B R G B R G
G B R G B R G B R
R G B R G B R G B

The color filter array elements prepared according to the invention can be used in image sensors or in a various-optical devices such as electroscopic light valves or liquid crystal display devices. Such liquid crystal display devices are described, for example, in UK. Patents 2,154,355; 2,130,781; 2,162,674; and 2,161,971.

Liquid crystal display devices are commonly made by placing a material, which is liquid crystalline at the operating temperature of the device, between two transparent electrodes, usually indium tin oxide coated on a substrate such as glass, and exiting the device by applying a potential across the electrodes. Alignment layers are provided over the transparent electrode layer on both substrates and are treated to orient the liquid crystal molecules in order to introduce a twist of e.g., 90°, between the substrates. Thus, the plane of polarization of plane polarized light will be rotated in a 90° angle as it passes through the twisted liquid crystal composition from one surface of the cell to the other surface. Application of an electric field between the selected electrodes of the cell causes the twist of the liquid crystal composition to be temporarily removed in the portion of the cell, the polarized light can be passed through the cell or extinguished, depending on whether or not a potential is applied.

The polymeric alignment layer described can be any of the materials commonly used in the liquid crystal art. The polymeric alignment layer described above can be any of the materials commonly used in the liquid crystal art. Exemplar of such materials include polyimides, polyvinyl alcohol, and methyl cellulose.

The transparent conducting layer described above is also conventional in the liquid crystal art. Examples of such materials include indium tin oxide, indium oxide, tin oxide.

FIG. 1 shows a cross sectional schematic of a color filter array 1 made in accordance with the present invention which can be used in making a color filter array for a liquid crystal display device (not shown). The color filter array 1 includes a rigid transparent support or substrate 3 formed of glass, plastic, or other suitable material. The color filter array includes red (R), green (G), and blue (B) color stripe, color cells, or pixel cells 5 imbedded in a polymer image receiving layer 15. It will be understood to those skilled in the art that other colors such as cyan, magenta, and yellow can also be used. Black grid lines 7 separate each color pixel. The color filter array 1 has a polymeric protective overcoat layer 9 and also can be coated with a transparent conducting layer such as tin oxide (ITO) 11. When used in a liquid crystal device (LCD) an alignment layer (not shown) is used as will be understood by those skilled in the art.

Figure 2:
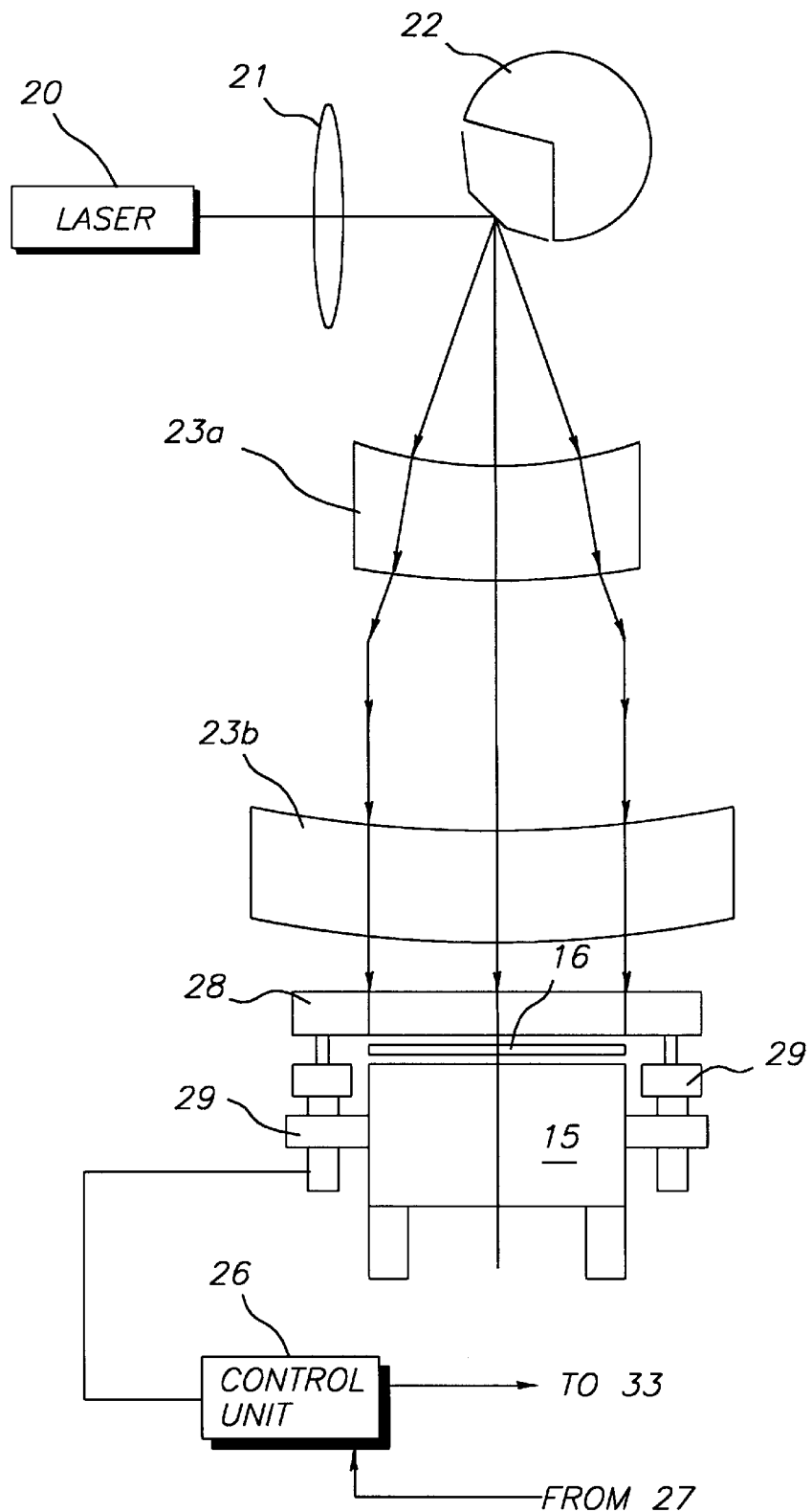
FIG. 2 is a schematic view of a printing apparatus which uses the print head array shown in FIGS. 4a and 4b.

Turning now to FIG. 2 which shows a schematic of a printing apparatus for making the color filter array 1 of FIG. 1. The apparatus functions by passing a receiver under a laser beam, a xenon flash or a stream of hot air from a nozzle/baffle. The energy density will be at a sufficient rate per area to sublimate colorant from a donor element 30. The receiver 16 includes a polymer image receiving layer. The receiver 16 has surface variations and the polymer image receiving layer has variations in thickness. The present invention thereby is adapted to compensate for these variations to maintain a uniform sublimation gap G as will be described later. The energy range to transfer colorant can typically be from 0.3 Joule to 3 Joule per square centimeter. The receiver 16 is shown as a plate and can take various structures such as flexible rolls, sheets, and rigid sheets. FIG. 2 shows a movable carriage structure 15, which can move a receiver 16 with a suitably coated substrate into colorant receiving relationship with the donor element 30 (shown in FIG. 3). The apparatus is adapted to print a line at a time and FIG. 2 shows a laser printing device having a laser 20, associated beam shaping optics 21, a polygon beam scanner 22, and an F-theta lens 23a and 23b.

The carriage 15 is driven by a mechanical drive 25 (shown in FIG. 3) and feeds the receiver 16 to the color transfer position where it receives laser light focused by the F-theta lenses 23a and 23b onto the donor element 30. Colorant from the donor element 30 is transferred from the donor element 30 to the receiver 16 through a sublimation gap. More particularly, the donor element 30 is wrapped around the shaped print head 28 (FIGS. 3 and 4b) and held in a position to define a sublimation gap G. Preferably, the print head 28 can be manufactured as a sandwich so that the pixel shapes 24 (see FIG. 4a) can be generated in many different shapes, but a rectangular shape is shown. The print head 28 can also be produced in a single piece and the pixel shapes 24 (FIG. 4a) for instance could be generated by a wire electro-discharge process. A control unit 26 includes a servo control is shown to precisely control the position of the print head 28 relative to the receiver surface. That in turn provides a uniform sublimation gap between the donor element 30 and the receiver surface so that a broad energy front can sweep across the donor element 30 and print head 28 to accurately and uniformly sublimate colorant to the receiver 16. Pixels and pixel color can now be deposited as needed to produce a color filter array. The control unit servo can be open loop, mechanical tracking, or in the preferable method a feed back system with a sensor 27 (FIG. 4b). The sensor 27 measures the position of the top surface of the image receiving layer of the receiver 16 relative to the print head 28 and is the basic input used by the control unit 26. The sensor 27 can function by capacitance, interferrometric, displacement, a nozzle baffle, or differential transformers. To position the print head 28 correctly, two actuators 29 are provided on both sides of the carriage 15 to accomplish the micro motion needed to provide the desired uniform sublimation gap. The actuators 29 are shown in FIG. 2. The control unit 26 interprets the information from sensor 27 and adjusts the actuators 29 for positioning the carriage 15. Those skilled in the art will appreciate a number of actuators (not shown) can be used to adjust different portions of the print head 28 so that its surface conforms to the top surface of the image-receiving layer of the receiver 16. These actuators 29 which can achieve the needed micro motion of the print head 28 can be electromagnetic, piezo, heat stress or have other displacement transducer designs. The sensor information is also used to turn the sublimation device on when the desired sublimation gap is achieved.

Figure 3:
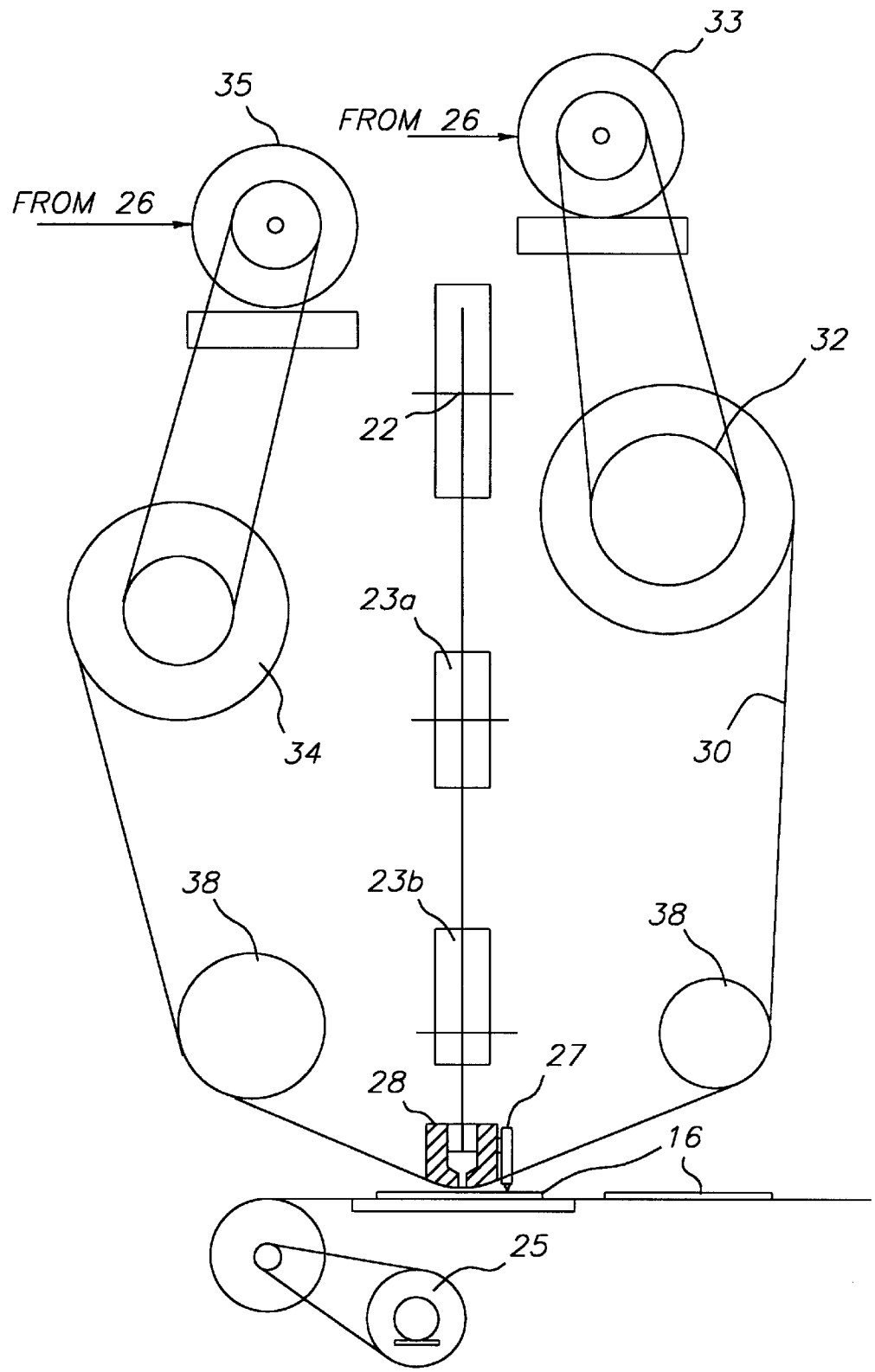
FIG. 3 is a side view showing one print head in cross-section with a donor element wrapped around the printhead.

As shown in FIG. 3, the donor element 30 is in the form of a flexible web and is wound upon a supply spool 32 which is controlled by motor 33. The motor 33 is driven by control unit 26 (See FIG. 2). Also there is provided a take-up spool 34 which is under the control of another motor 35. This motor 35 is also controlled by the control unit 26. In operation, as the motors 33 and 35 are energized they cause the donor element 30 to be paid out from the supply spool 32 in a suitable amount to replace the colorant that has been used. Necessary guide rollers 38 are also provided to position the donor element 30 across the print head 28. The print head 28 in combination with a tensioning force by motors 33 and 35 provide the donor element 30 with a rigid support structure so that structural deformation to the donor element 30 are controlled and will not interfere with the sublimation of the colorant.

Figure 4A:
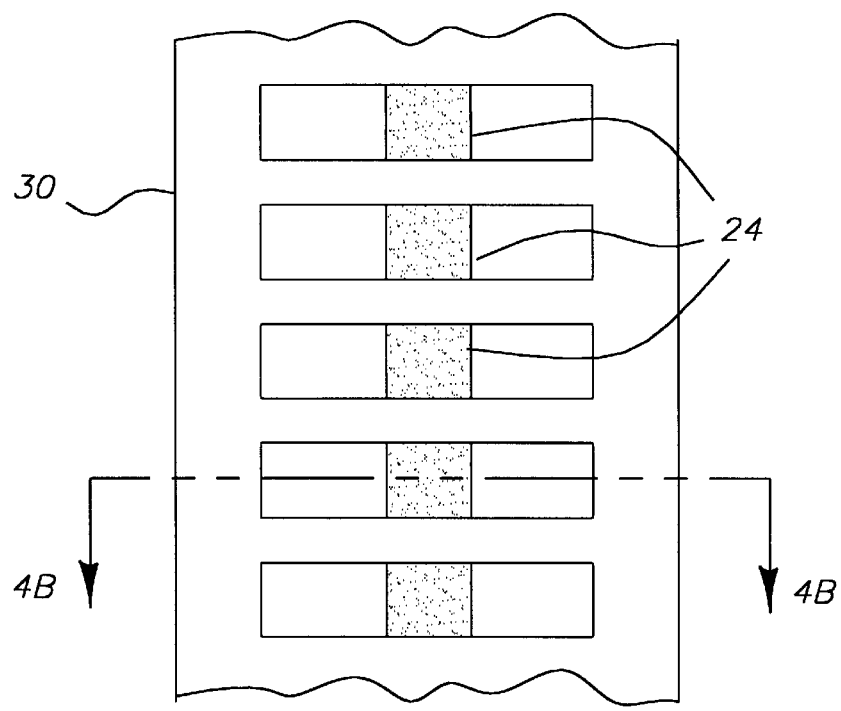
FIG. 4a is a top view of an array of print head in a laser line scan printer apparatus in accordance with the present invention for making the color filter array of FIG. 1.
Figure 4B:
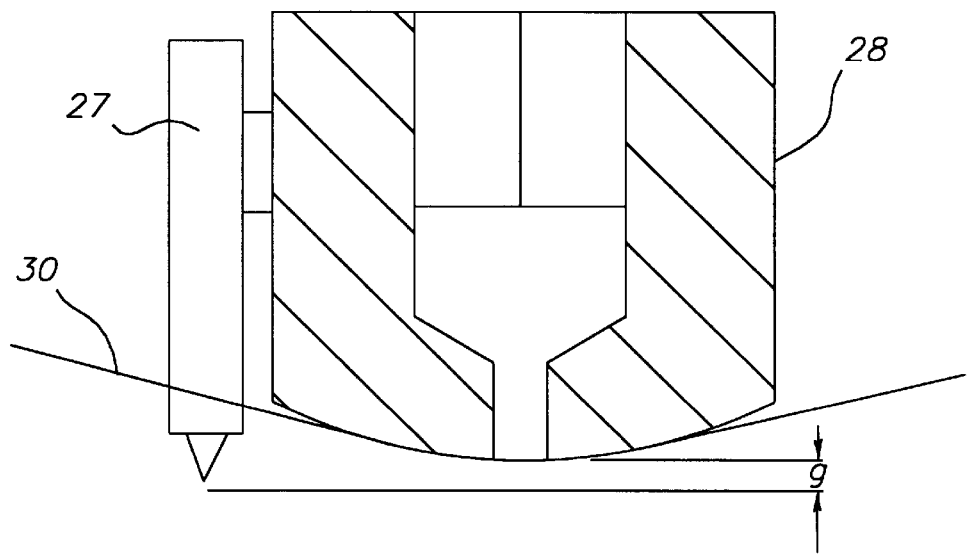
FIG. 4b is a sectional view of a print head of FIG. 4a taken along the lines 4—4.

Turning now to FIG. 4a where a pixel array on a print head 28 is shown. Each print head 28 is adapted to direct energy to the donor element 30 to cause colorant to transfer to the receiver 16. The pixel array of print heads 28, of course, prints a line of colored pixels at a time.

Turning now to FIG. 4b the print head 28 is shaped so that the donor is wrapped wrinkle free around its surface. The print head 28 transmits masked energy to the donor element 30 by means of one of several energy sources. In a preferred embodiment, the print head 28 in FIG. 4b receives a beam of high intensity laser light which is adapted to pass through an opening 28a and illuminate the donor element 30 which forms pixels 24 shown in FIG. 4a. The sublimation gap G is measured by means of the sensor 27. The sensor 27 is secured to the print head 28 and includes an end portion 27a that senses the receiver 16. When variations in the receiver 16 are detected in this method then actuators 29 are adjusted to maintain the sublimation gap G. In thermal printing it has been found that the sublimation gap G should be larger than 1 micron.

The invention has been described in detail with particular reference to certain preferred embodiments thereof, but it will be understood that variations and modifications can be effected within the spirit and scope of the invention.

PARTS LIST 1 color filter array
3 substrate
5 pixel cells
7 black grid lines
9 overcoat layer
11 ITO layer
15 polymer image receiving layer
16 receiver
17 carriage structure
20 laser
21 beam shaping optics
22 scanner
23a F-theta lens
23b F-theta lens
24 pixel shapes
25 mechanical drive
26 control unit
27 sensor
28 print head
29 actuators
30 donor element
32 supply spool
33 motor
34 take-up spool
35 motor
38 guide rollers

What is claimed is:

1. Apparatus having a print head for transmitting energy to a colorant donor element, the energy causing colorant from the colorant donor element to transfer to an image receiving layer to produce a color filter array, the image-receiving layer having an image-receiving surface comprising:

a) means for locating the colorant donor element gap and the image-receiving layer a precise sublimation gap G from the image-receiving layer surface during transferring the colorant donor element to the image-receiving layer, b) means for maintaining the sublimation gap G to compensate for dimensional variations in the image-receiving layer; and c) wherein the sublimation gap maintaining means includes sensing means for producing an electrical signal which is proportional to the variations in the sublimation gap G and further including means for positioning the print head in accordance with the electrical signal to maintain the sublimation gap thereby compensating for the dimensional variations in the image-receiving layer.

2. The apparatus of claim 1 wherein the image-receiving layer is a polymer and the colorant is a sublimable dye which can be transferred by application of the energy to the colorant donor element.

3. The apparatus of claim 1 further including means for providing relative movement between the colorant donor element and the print head to produce the color array pattern on the polymer image-receiving layer.

4. The apparatus of claim 2 wherein the sublimation gap is greater than 1 micron.

* * * * *